United States Patent
Damnjanovic et al.

(10) Patent No.: US 9,313,744 B2
(45) Date of Patent: Apr. 12, 2016

(54) METHOD AND APPARATUS FOR CONFIGURING TRAFFIC-TO-PILOT POWER RATIOS IN HETEROGENEOUS NETWORKS

(71) Applicant: QUALCOMM Incorporated, San Diego, CA (US)

(72) Inventors: Aleksandar Damnjanovic, Del Mar, CA (US); Jelena M. Damnjanovic, Del Mar, CA (US); Yongbin Wei, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/662,207

(22) Filed: Oct. 26, 2012

(65) Prior Publication Data

US 2013/0107823 A1    May 2, 2013

Related U.S. Application Data

(60) Provisional application No. 61/553,106, filed on Oct. 28, 2011.

(51) Int. Cl.
*H04W 4/00* (2009.01)
*H04W 52/16* (2009.01)
(Continued)

(52) U.S. Cl.
CPC ............ *H04W 52/16* (2013.01); *H04W 52/244* (2013.01); *H04W 52/143* (2013.01); *H04W 52/34* (2013.01)

(58) Field of Classification Search
CPC ... H04W 52/16; H04W 52/34; H04W 52/244; H04W 52/226; H04W 52/243

USPC ................... 370/252, 318, 329–338
See application file for complete search history.

(56) References Cited

U.S. PATENT DOCUMENTS

| 6,711,208 B2 | 3/2004 | Razoumov et al. |
| 7,068,683 B1 | 6/2006 | Lundby et al. |

(Continued)

FOREIGN PATENT DOCUMENTS

| EP | 2077632 A2 | 7/2009 |
| JP | 2011/509621 A | 3/2011 |

(Continued)

OTHER PUBLICATIONS

International Search Report and Written Opinion—PCT/US2012/062340—ISA/EPO—Aug. 5, 2013. 20 pages.

(Continued)

*Primary Examiner* — Kan Yuen
(74) *Attorney, Agent, or Firm* — Arent Fox LLP

(57) ABSTRACT

A method, an apparatus, and a computer program product for wireless communication are provided in connection with specifying a traffic-to-pilot (T/P) ratio per subframe and/or resource block to allow a base station to transmit over the subframes and/or resource blocks using varying transmit powers. In one example, a device communicating with the base station can receive a plurality of T/P ratios each related to a power used by the base station to transmit over one of a plurality of carriers in a specific subframe or resource block, determine a power of a reference signal received from the base station over a carrier of the plurality of carriers, and process a data signal received over the carrier within the specific subframe or resource block based in part on applying, to the power of the reference signal, a T/P ratio of the plurality of T/P ratios corresponding to the carrier.

8 Claims, 13 Drawing Sheets

(51) Int. Cl.
*H04W 52/24* (2009.01)
*H04W 52/14* (2009.01)
*H04W 52/34* (2009.01)

(56) References Cited

U.S. PATENT DOCUMENTS

| | | | |
|---|---|---|---|
| 7,369,501 | B2 | 5/2008 | Kim et al. |
| 7,986,680 | B2 | 7/2011 | Kim et al. |
| 8,165,186 | B2 | 4/2012 | Luo et al. |
| 8,189,556 | B2 | 5/2012 | Lee et al. |
| 2005/0094595 | A1 | 5/2005 | Saifudin |
| 2007/0121554 | A1 | 5/2007 | Luo et al. |
| 2007/0280146 | A1* | 12/2007 | Nagaraj et al. ............ 370/318 |
| 2008/0219342 | A1 | 9/2008 | Sambhwani et al. |
| 2009/0175371 | A1* | 7/2009 | Zhang et al. ............ 375/260 |
| 2009/0252077 | A1 | 10/2009 | Khandekar et al. |
| 2010/0278149 | A1 | 11/2010 | Kim et al. |
| 2010/0309861 | A1* | 12/2010 | Gorokhov et al. ............ 370/329 |
| 2011/0190024 | A1 | 8/2011 | Seong et al. |
| 2012/0224555 | A1* | 9/2012 | Lee et al. ............ 370/329 |

FOREIGN PATENT DOCUMENTS

| | | | |
|---|---|---|---|
| KR | 2009/0076830 A | | 7/2009 |
| KR | 2011-0011507 A | | 2/2011 |
| WO | 0241509 A2 | | 5/2002 |
| WO | WO-2006/116704 A2 | | 11/2006 |
| WO | WO-2009/088218 A2 | | 7/2009 |
| WO | WO-2010/091421 A1 | | 8/2010 |
| WO | WO-2010/141911 A2 | | 12/2010 |

OTHER PUBLICATIONS

Partial International Search Report—PCT/US2012/062340—ISA/EPO—Apr. 2, 2013.

Samsung; "Further Discussion on Data Power Setting for PDSCH", 3GPP Draft; R1-081230_Further_ConsiderationPower_Setting_PDSCH, 3rd Generation Partnership Project (3GPP), Mobile Competence Centre; 650, Route Des Lucioles; F-06921 Sophia-Antipolis Cedex; France, vol. RAN WG1, no. Shenzhen, China; Mar. 26, 2008, XP050109674.

System performance evaluations on FeICIC, 3GPP TG-RAN WG1 #66bis, Zhuhai, China, Oct. 10-14, 2011, 8 pages.

European Search Report—EP15161470—Search Authority—Munich—Jul. 9, 2015. (6 total pages).

European Search Report—EP15161642—Search Authority—Munich—Jul. 10, 2015. (6 total pages).

* cited by examiner

METHOD AND APPARATUS FOR CONFIGURING TRAFFIC-TO-PILOT POWER RATIOS IN HETEROGENEOUS NETWORKS

CLAIM OF PRIORITY UNDER 35 U.S.C. §119

The present application for Patent claims priority to Provisional Application No. 61/553,106, entitled METHOD AND APPARATUS FOR CONFIGURING TRAFFIC-TO-PILOT POWER RATIOS IN HETEROGENEOUS NETWORKS, filed Oct. 28, 2011, and assigned to the assignee hereof and hereby expressly incorporated by reference herein.

BACKGROUND

1. Field

Aspects of the present disclosure relate generally to wireless communication systems, and more particularly to transmitting signals at varying powers.

2. Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. Further, communications between mobile devices and base stations may be established via single-input single-output (SISO) systems, multiple-input single-output (MISO) systems, multiple-input multiple-output (MIMO) systems, and so forth. In addition, mobile devices can communicate with other mobile devices (and/or base stations with other base stations) in peer-to-peer wireless network configurations.

To supplement conventional base stations, additional low power base stations can be deployed to provide more robust wireless coverage to mobile devices. For example, low power base stations (e.g., which can be commonly referred to as Home NodeBs or Home eNBs, collectively referred to as H(e)NBs, femto nodes, femtocell nodes, pico nodes, micro nodes, etc.) can be deployed for incremental capacity growth, richer user experience, in-building or other specific geographic coverage, and/or the like. In some configurations, such low power base stations are connected to the Internet via broadband connection (e.g., digital subscriber line (DSL) router, cable or other modem, etc.), which can provide the backhaul link to the mobile operator's network. In this regard, low power base stations are often deployed in homes, offices, etc. without consideration of a current network environment. Thus, low power base stations can be subject to, or can cause, substantial interference with other base stations (e.g., other low power base stations and/or macro base stations) in a wireless network.

Some concepts have been developed to address such interference, including cell range expansion (CRE), which allows a device to be served by a low power base station even where another low power base station or high power base station are near enough to cause interference. This can be provided by using an interference coordination scheme, such as enhanced inter-cell interference coordination (eICIC) to coordinate resources among base stations (e.g., using negotiations over a backhaul link between the base stations). Communications from the base stations, however, can still be hindered by requiring use of the interference coordination scheme since such schemes often result in at least one base station not utilizing protected resources negotiated by another base station.

As the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, the present disclosure describes various aspects in connection with specifying a traffic-to-pilot (T/P) ratio per subframe and/or resource block to allow a base station to transmit over the subframes and/or resource blocks using varying transmit powers. A device communicating with the base station can receive a plurality of T/P ratios each related to a power used by the base station to transmit over one of a plurality of carriers in a specific subframe or resource block. Further, the device can determine a power of a reference signal received from the base station over a carrier of the plurality of carriers. Moreover, the device can process a data signal received over the carrier within the specific subframe or resource block based in part on applying, to the power of the reference signal, a T/P ratio of the plurality of T/P ratios corresponding to the carrier.

In another example, the device can receive a reference signal from a base station and an interfering reference signal from an interfering base station over a specific subframe or resource block, and receive a first T/P ratio utilized by the interfering base station to transmit over the specific subframe or resource block. The device can partially cancel an interfering data signal of the interfering base station from a data signal of the base station received in the specific subframe or resource block based in part on the first T/P ratio. Moreover, the device can receive a second T/P ratio related to a power used by the base station to transmit the data signal in the specific subframe or resource block, determine a power of the reference signal received from the base station, and process the data signal following partially canceling the interfering data signal based in part on applying the second T/P ratio to the power of the reference signal.

In another example, device can transmit a reference signal over each of multiple carriers. The device can further determine a transmit power for communicating data signals over each of the multiple carriers, and indicate a T/P ratio for each of the multiple carriers to a device specifying the transmit power for the data signals as compared to a power of the reference signals over each of the multiple carriers. Moreover, the device can transmit the data signals over each of the multiple carriers according to the transmit power.

In still another example, device can transmit a reference signal. The device can further negotiate a subframe or resource block with a base station as being protected resources for the base station, determine a transmit power for communicating data signals over the protected resources for the base station, and indicate one or more T/P ratios to a device for the transmit power in the protected resources as compared to a power of the reference signal. Moreover, the device can transmit the data signals over the protected resources according to the transmit power.

According to related aspects, a method for processing signals from a base station based on a T/P ratio is provided. The method can include receiving a plurality of T/P ratios each related to a power used by a base station to transmit over one of a plurality of carriers in a specific subframe or resource block. Further, the method can include determining a power of a reference signal received from the base station over a carrier of the plurality of carriers. Moreover, the method may include processing a data signal received over the carrier within the specific subframe or resource block based in part on applying, to the power of the reference signal, a T/P ratio of the plurality of T/P ratios corresponding to the carrier.

Another aspect relates to a communications apparatus configured to process signals from a base station based on a T/P ratio. The communications apparatus can include means for receiving a plurality of T/P ratios each related to a power used by a base station to transmit over one of a plurality of carriers in a specific subframe or resource block. Further, the communications apparatus can include means for determining a power of a reference signal received from the base station over a carrier of the plurality of carriers. Moreover, the communications apparatus can include means for processing a data signal received over the carrier within the specific subframe or resource block based in part on applying, to the power of the reference signal, a T/P ratio of the plurality of T/P ratios corresponding to the carrier.

Another aspect relates to a communications apparatus. The apparatus can include a processing system configured to receive a plurality of T/P ratios each related to a power used by a base station to transmit over one of a plurality of carriers in a specific subframe or resource block. Further, the processing system may be configured to determine a power of a reference signal received from the base station over a carrier of the plurality of carriers. Moreover, the processing system may be configured to process a data signal received over the carrier within the specific subframe or resource block based in part on applying, to the power of the reference signal, a T/P ratio of the plurality of T/P ratios corresponding to the carrier.

Still another aspect relates to a computer program product, which can have a computer-readable medium including code for receiving a plurality of T/P ratios each related to a power used by a base station to transmit over one of a plurality of carriers in a specific subframe or resource block. Further, the computer-readable medium can include code for determining a power of a reference signal received from the base station over a carrier of the plurality of carriers. Moreover, the computer-readable medium can include code for processing a data signal received over the carrier within the specific subframe or resource block based in part on applying, to the power of the reference signal, a T/P ratio of the plurality of T/P ratios corresponding to the carrier.

According to related aspects, a method for processing signals from a base station based on a T/P ratio is provided. The method can include receiving a reference signal from a base station and an interfering reference signal from an interfering base station over a specific subframe or resource block. Further, the method can include receiving a first T/P ratio utilized by the interfering base station to transmit over the specific subframe or resource block. Further, the method can include partially canceling an interfering data signal of the interfering base station from a data signal of the base station received in the specific subframe or resource block based in part on the first T/P ratio. Further, the method can include receiving a second T/P ratio related to a power used by the base station to transmit the data signal in the specific subframe or resource block. Further, the method can include determining a power of the reference signal received from the base station. Moreover, the method may include processing the data signal following partially canceling the interfering data signal based in part on applying the second T/P ratio to the power of the reference signal.

Another aspect relates to a communications apparatus configured to process signals from a base station based on a T/P ratio. The communications apparatus can include means for receiving a reference signal from a base station and an interfering reference signal from an interfering base station over a specific subframe or resource block. Further, the communications apparatus can include means for receiving a first T/P ratio utilized by the interfering base station to transmit over the specific subframe or resource block. Further, the communications apparatus can include means for partially canceling an interfering data signal of the interfering base station from a data signal of the base station received in the specific subframe or resource block based in part on the first T/P ratio. Further, the communications apparatus can include means for receiving a second T/P ratio related to a power used by the base station to transmit the data signal in the specific subframe or resource block. Further, the communications apparatus can include means for determining a power of the reference signal received from the base station. Moreover, the communications apparatus can include means for processing the data signal following partially canceling the interfering data signal based in part on applying the second T/P ratio to the power of the reference signal.

Another aspect relates to a communications apparatus. The apparatus can include a processing system configured to receive a reference signal from a base station and an interfering reference signal from an interfering base station over a specific subframe or resource block. Further, the processing system may be configured to receive a first T/P ratio utilized by the interfering base station to transmit over the specific subframe or resource block. Further, the processing system may be configured to partially cancel an interfering data signal of the interfering base station from a data signal of the base station received in the specific subframe or resource block based in part on the first T/P ratio. Further, the processing system may be configured to receive a second T/P ratio related to a power used by the base station to transmit the data signal in the specific subframe or resource block. Further, the processing system may be configured to determine a power of the reference signal received from the base station. Moreover, the processing system may be configured to process the data signal following partially canceling the interfering data signal based in part on applying the second T/P ratio to the power of the reference signal.

Still another aspect relates to a computer program product, which can have a computer-readable medium including code for receiving a reference signal from a base station and an interfering reference signal from an interfering base station over a specific subframe or resource block. Further, the computer-readable medium can include code for receiving a first T/P ratio utilized by the interfering base station to transmit over the specific subframe or resource block. Further, the computer-readable medium can include code for partially canceling an interfering data signal of the interfering base station from a data signal of the base station received in the specific subframe or resource block based in part on the first T/P ratio. Further, the computer-readable medium can include code for receiving a second T/P ratio related to a power used by the base station to transmit the data signal in the specific subframe or resource block. Further, the computer-readable medium can include code for determining a power of the reference signal received from the base station. Moreover, the computer-readable medium can include code for processing the data signal following partially canceling the interfering data signal based in part on applying the second T/P ratio to the power of the reference signal.

According to related aspects, a method for transmission using varying power in a subframe or resource block is provided. The method can include transmitting a reference signal over each of multiple carriers. Further, the method can include determining a transmit power for communicating data signals over each of the multiple carriers. Further, the method can include indicating a T/P ratio for each of the multiple carriers to a device specifying the transmit power for the data signals as compared to a power of the reference signals over each of the multiple carriers. Moreover, the method may include transmitting the data signals over each of the multiple carriers according to the transmit power.

Another aspect relates to a communications apparatus configured to transmit using varying power in a subframe or resource block. The communications apparatus can include means for transmitting a reference signal over each of multiple carriers. Further, the communications apparatus can include means for determining a transmit power for communicating data signals over each of the multiple carriers. Further, the communications apparatus can include means for indicating a T/P ratio for each of the multiple carriers to a device specifying the transmit power for the data signals as compared to a power of the reference signals over each of the multiple carriers. Moreover, the communications apparatus can include means for transmitting the data signals over each of the multiple carriers according to the transmit power.

Another aspect relates to a communications apparatus. The apparatus can include a processing system configured to transmit a reference signal over each of multiple carriers. Further, the processing system may be configured to determine a transmit power for communicating data signals over each of the multiple carriers. Further, the processing system may be configured to indicate a T/P ratio for each of the multiple carriers to a device specifying the transmit power for the data signals as compared to a power of the reference signals over each of the multiple carriers. Moreover, the processing system may be configured to transmit the data signals over each of the multiple carriers according to the transmit power.

Still another aspect relates to a computer program product, which can have a computer-readable medium including code for transmitting a reference signal over each of multiple carriers. Further, the computer-readable medium can include code for determining a transmit power for communicating data signals over each of the multiple carriers. Further, the computer-readable medium can include code for indicating a T/P ratio for each of the multiple carriers to a device specifying the transmit power for the data signals as compared to a power of the reference signals over each of the multiple carriers. Moreover, the computer-readable medium can include code for transmitting the data signals over each of the multiple carriers according to the transmit power.

According to related aspects, a method for transmission using varying power in a subframe or resource block is provided. The method can include transmitting a reference signal. Further, the method can include negotiating a subframe or resource block with a base station as being protected resources for the base station. Further, the method can include determining a transmit power for communicating data signals over the protected resources for the base station. Further, the method can include indicating one or more T/P ratios to a device for the transmit power in the protected resources as compared to a power of the reference signal. Moreover, the method may include transmitting the data signals over the protected resources according to the transmit power.

Another aspect relates to a communications apparatus configured to transmit using varying power in a subframe or resource block. The communications apparatus can include means for transmitting a reference signal. Further, the communications apparatus can include means for negotiating a subframe or resource block with a base station as being protected resources for the base station. Further, the communications apparatus can include means for determining a transmit power for communicating data signals over the protected resources for the base station. Further, the communications apparatus can include means for indicating one or more T/P ratios to a device for the transmit power in the protected resources as compared to a power of the reference signal. Moreover, the communications apparatus can include means for transmitting the data signals over the protected resources according to the transmit power.

Another aspect relates to a communications apparatus. The apparatus can include a processing system configured to transmit a reference signal. Further, the processing system may be configured to negotiate a subframe or resource block with a base station as being protected resources for the base station. Further, the processing system may be configured to determine a transmit power for communicating data signals over the protected resources for the base station. Further, the processing system may be configured to indicate one or more T/P ratios to a device for the transmit power in the protected resources as compared to a power of the reference signal. Moreover, the processing system may be configured to transmit the data signals over the protected resources according to the transmit power.

Still another aspect relates to a computer program product, which can have a computer-readable medium including code for transmitting a reference signal. Further, the computer-readable medium can include code for negotiating a subframe or resource block with a base station as being protected resources for the base station. Further, the computer-readable medium can include code for determining a transmit power for communicating data signals over the protected resources for the base station. Further, the computer-readable medium can include code for indicating one or more T/P ratios to a device for the transmit power in the protected resources as compared to a power of the reference signal. Moreover, the computer-readable medium can include code for transmitting the data signals over the protected resources according to the transmit power.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

DETAILED DESCRIPTION

Figure 1:
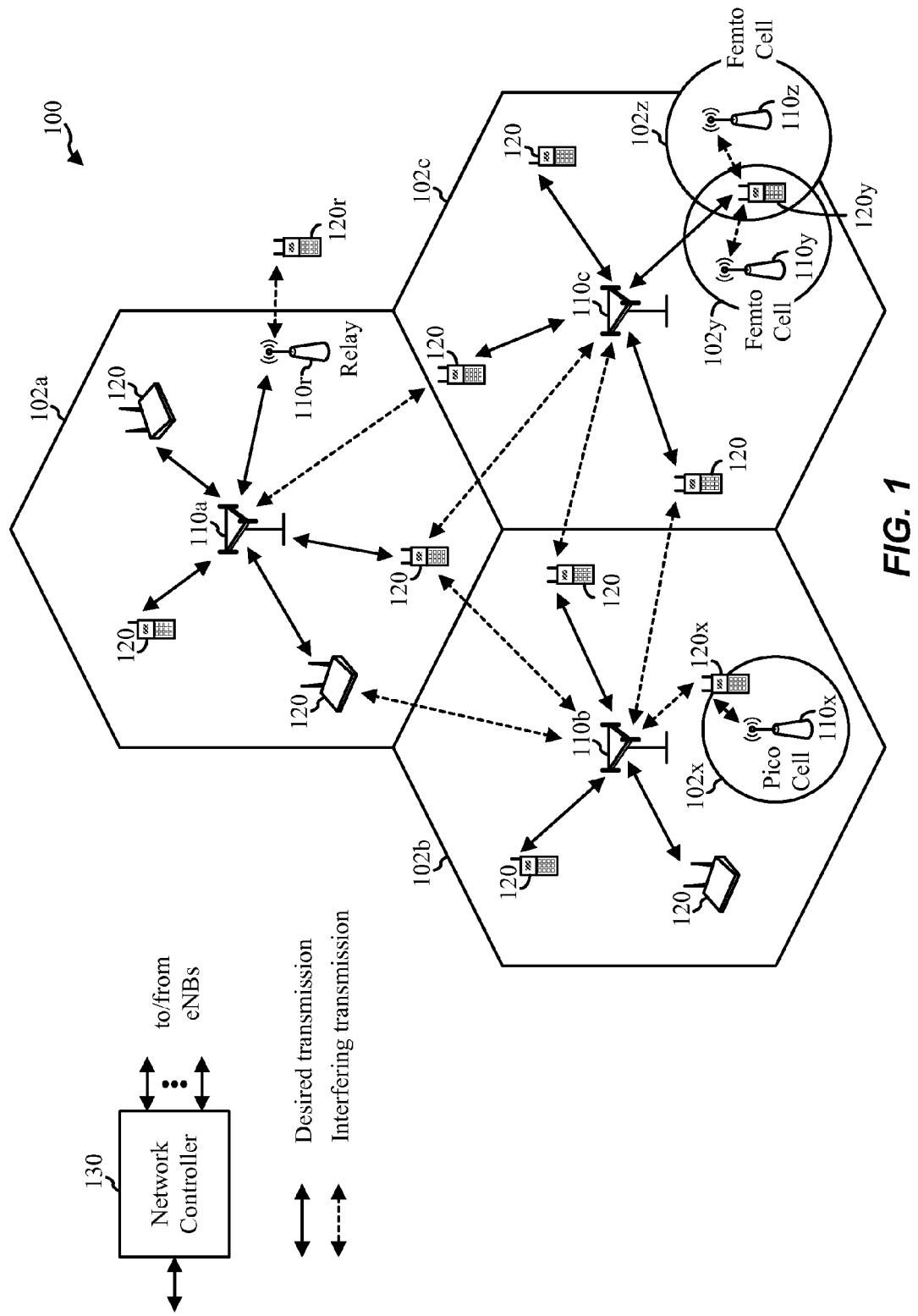
FIG. 1 is a block diagram conceptually illustrating an example of a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Described herein are aspects related to a base station specifying a traffic-to-pilot (T/P) ratio used to transmit data per subframe and/or resource block (RB). For example, a T/P ratio can be used to indicate a level of power used to transmit data (e.g., traffic) as compared to a level of power used to transmit a reference signal (e.g., pilot). The T/P ratio can be used by a receiving device to determine the transmit power of a signal carrying data in the corresponding subframe and/or RB. This power, for example, can be used in demodulating the signal, determining channel state (CSI) feedback, such as channel quality indicator (CQI), and/or the like. Using varying powers for data transmissions, in an example, can allow a serving base station to implement more robust interference coordination (e.g., for cell range expansion (CRE)) with one or more other base stations where the serving base station can communicate with a device over protected resources negotiated by the one or more other base stations by transmitting at a reduced power.

In addition, for example, where the serving base station and one or more other base stations transmit colliding reference signals, a device can obtain the T/P ratio of the one or more other base stations over a subframe and/or RB to partially cancel interference of the reference signal transmitted by the one or more other base stations. This can render a more accurate representation of the signal as transmitted from the serving base station for demodulating, reporting CSI feedback, and/or the like. Furthermore, allowing varying transmission powers from a base station can also be beneficial in carrier aggregation (CA) where a device can communicate with a base station over multiple carriers.

For example, in conventional CA, a macro base station transmits at a reduced power over at least one carrier to prevent total reference signal collision with the low power base stations. Thus, using the concepts described above for example, the macro base station can transmit a reference signal at a higher power (e.g., full power), while specifying T/P ratios per subframe and/or RB for data communications over the at least one carrier. Where the reference signals of the macro base station and low power base station collide, a device communicating with the low power base station can receive T/P ratio(s) used by the macro base station in a given subframe and/or resources block, and can accordingly partially cancel interference caused by the reference signal based on the T/P ratio.

A low power base station, as referenced herein, can include a femto node, a pico node, micro node, home Node B or home evolved Node B (H(e)NB), relay, and/or other low power base stations, and can be referred to herein using one of these terms, though use of these terms is intended to generally encompass low power base stations. For example, a low power base station transmits at a relatively low power as compared to a macro base station associated with a wireless wide area network (WWAN). As such, the coverage area of the low power base station can be substantially smaller than the coverage area of a macro base station.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for all releases of LTE/LTE-A, and LTE/LTE-A terminology is used in much of the description below.

FIG. 1 shows a wireless communication network 100, which may be an LTE/LTE-A network. The wireless network 100 may include a number of evolved Node Bs (eNBs) 110 and other network entities. An eNB may be a station that communicates with the UEs and may also be referred to as a base station, a Node B, an access point, etc. Each eNB 110 may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). An eNB for a macro cell may be referred to as a macro eNB. An eNB for a pico cell may be referred to as a pico eNB. An eNB for a femto cell may be referred to as a femto eNB or a home eNB. In the example shown in FIG. 1, the eNBs 110a, 110b and 110c may be macro eNBs for the macro cells 102a, 102b and 102c, respectively. The eNB 110x may be a pico eNB for a pico cell 102x. The eNBs 110y and 110z may be femto eNBs for the femto cells 102y and 102z, respectively. An eNB may support one or multiple (e.g., three) cells.

The wireless network 100 may also include relay stations. A relay station is a station that receives a transmission of data and/or other information from an upstream station (e.g., an eNB or a UE) and sends a transmission of the data and/or other information to a downstream station (e.g., a UE or an eNB). A relay station may also be a UE that relays transmissions for other UEs. In the example shown in FIG. 1, a relay station 110r may communicate with the eNB 110a and a UE 120r in order to facilitate communication between the eNB 110a and the UE 120r. A relay station may also be referred to as a relay eNB, a relay, etc.

The wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in the wireless network 100. For example, macro eNBs may have a high transmit power level (e.g., 20 Watts) whereas pico eNBs, femto eNBs and relays may have a lower transmit power level (e.g., 1 Watt).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for both synchronous and asynchronous operation.

A network controller 130 may couple to a set of eNBs and provide coordination and control for these eNBs. The network controller 130 may communicate with the eNBs 110 via a backhaul. The eNBs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a device, a terminal, a mobile station, a subscriber unit, a station, etc. A UE may be a cellular phone, a smart phone, a personal digital assistant (PDA), a wireless modem (or other tethered device), a wireless communication device, a handheld device, a laptop computer, a tablet, a smartbook, a netbook, an ultrabook, a cordless phone, a wireless local loop (WLL) station, etc. A UE may be able to communicate with macro eNBs, pico eNBs, femto eNBs, relays, etc. In FIG. 1, a solid line with double arrows indicates desired transmissions between a UE and a serving eNB, which is an eNB designated to serve the UE on the downlink and/or uplink. A dashed line with double arrows indicates potentially interfering transmissions between a UE and an eNB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM or a similar multiplexing scheme and in the time domain with SC-FDM or a similar multiplexing scheme. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz, and there may be 1, 2, 4, 8 or 16 subbands for system bandwidth of 1.25, 2.5, 5, 10 or 20 MHz, respectively.

Figure 2:
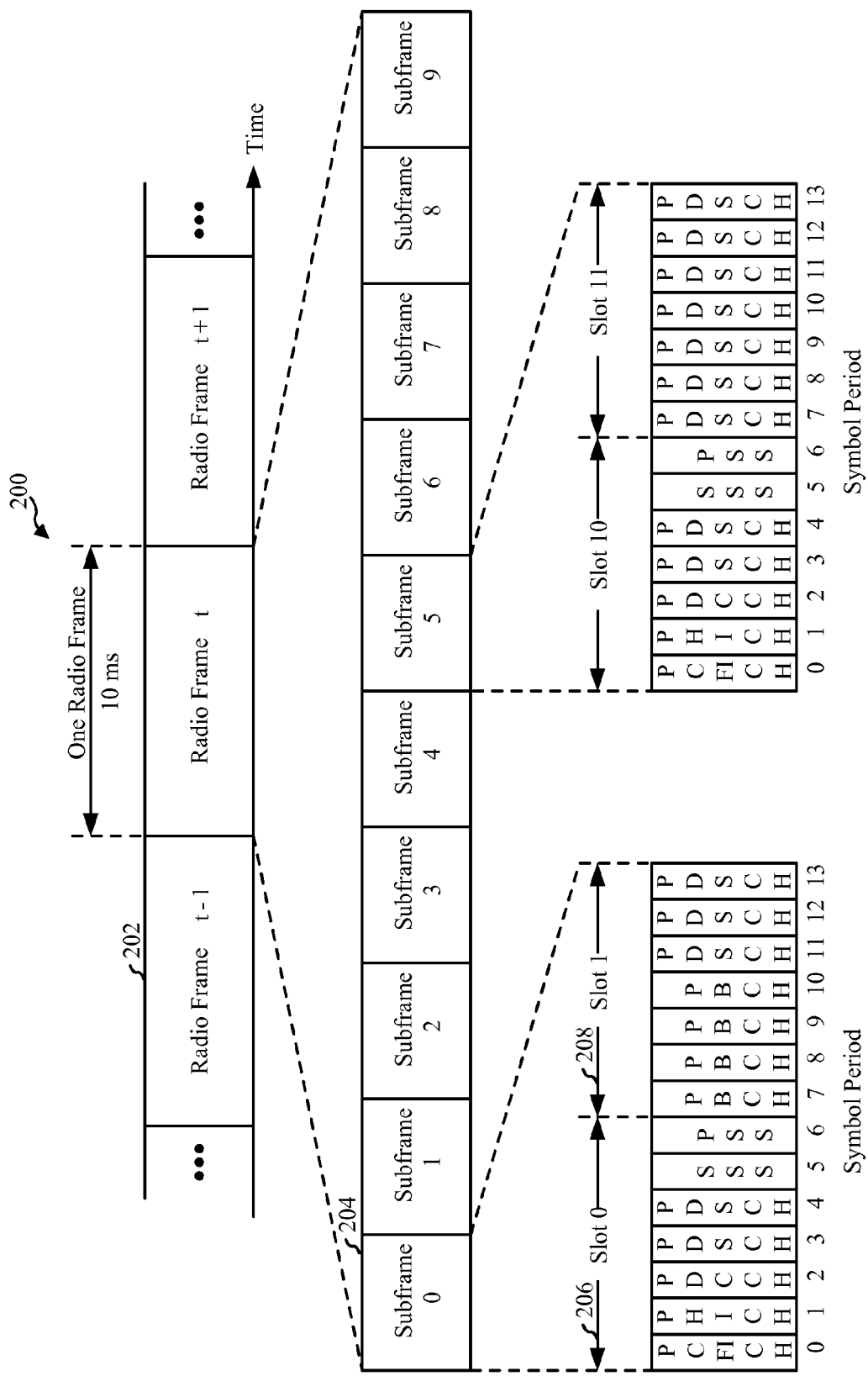
FIG. 2 is a block diagram conceptually illustrating an example of a down link frame structure in a telecommunications system.

FIG. 2 shows a down link frame structure 200 used in LTE. The transmission timeline for the downlink may be partitioned into units of radio frames, such as radio frame 202. Each radio frame may have a predetermined duration (e.g., 10 milliseconds (ms)) and may be partitioned into 10 subframes with indices of 0 through 9, such as subframe 0 204. Each subframe may include two slots, such as slot 0 206 and slot 1 208. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into RBs. Each RB may cover N subcarriers (e.g., 12 subcarriers) in one slot.

In LTE, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in a portion of the first symbol period of each subframe, although depicted in the entire first symbol period in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 RBs. In the example shown in FIG. 2, M=3. The eNB may send a Physical hybrid automatic repeat/request (HARQ) Indicator Channel (PHICH) and a Physical Downlink Control Channel (PDCCH) in the first M symbol periods of each subframe (M=3 in FIG. 2). The PHICH may carry information to support hybrid automatic retransmission (HARQ). The PDCCH may carry information on resource allocation for UEs and control information for downlink channels. Although not shown in the first symbol period in FIG. 2, it is understood that the PDCCH and PHICH are also included in the first symbol period. Similarly, the PHICH and PDCCH are also both in the second and third symbol periods, although not shown that way in FIG. 2. The eNB may send a Physical Downlink Shared Channel (PDSCH) in the remaining symbol periods of each subframe. The PDSCH may carry data for UEs scheduled for data transmission on the downlink. The various signals and channels can correspond to an LTE configuration.

The eNB may send the PSS, SSS and PBCH in a center of the system bandwidth used by the eNB (e.g., a center 1.08 megahertz (MHz)). The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REG). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
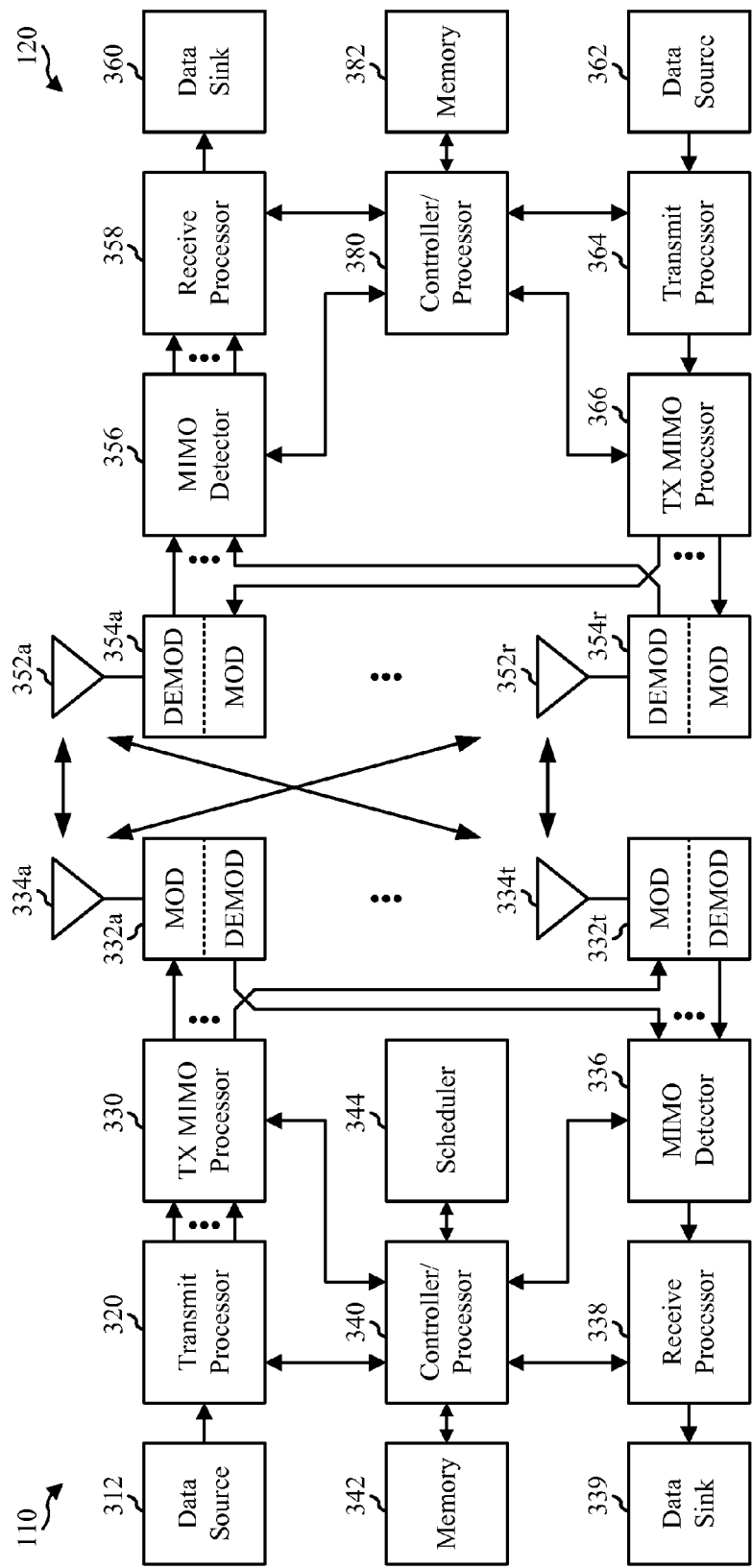
FIG. 3 is a block diagram conceptually illustrating is a block diagram conceptually illustrating a design of a base station/eNB and a UE configured according to one aspect of the present disclosure.

FIG. 3 shows a block diagram of a design of a base station/eNB 110 and a UE 120, which may be one of the base stations/eNBs and one of the UEs in FIG. 1. For a restricted association scenario, the base station 110 may be the macro eNB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the demodulators 354a through 354r (e.g., for SC-FDM, etc.), and transmitted to the base station 110. At the base station 110, the uplink signals from the UE 120 may be received by the antennas 334, processed by the modulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in, e.g., FIGS. 8-9, and/or other processes for the techniques described herein. In addition, for example, the processor 380 can comprise or at least be operatively coupled to modules illustrated in FIG. 7 for performing aspects described herein. The memories 342 and 382 may store data and program codes for the base station 110 and the UE 120, respectively, which can include instructions for executing methods in FIGS. 8-11, the modules in FIG. 7, and/or the like. A scheduler 344 may schedule UEs for data transmission on the downlink and/or uplink.

Carrier Aggregation

LTE-Advanced UEs can use spectrum in 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments can conserve spectrum and are a good fit for the typically asymmetric bandwidth utilization by broadband subscribers, though other assignments can be possible.

Carrier Aggregation Types

Figure 4A:
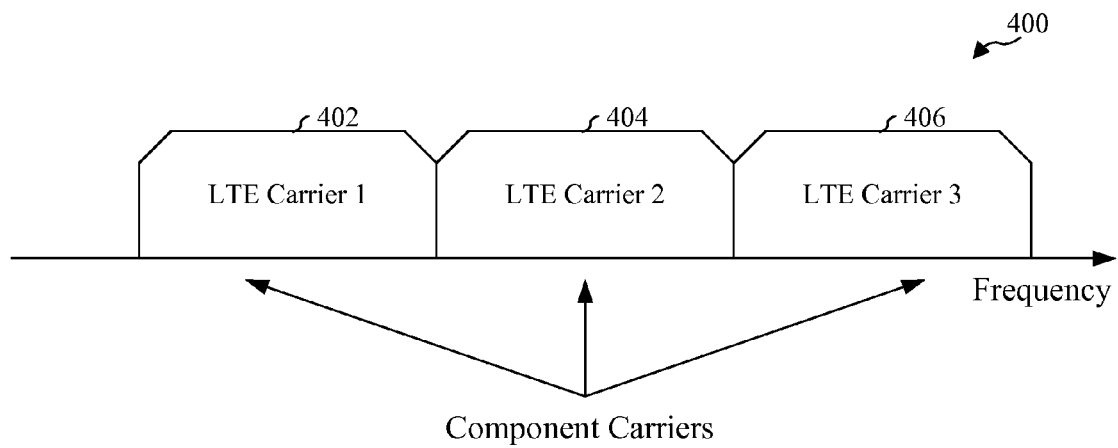
FIG. 4A discloses a continuous carrier aggregation type.
Figure 4B:
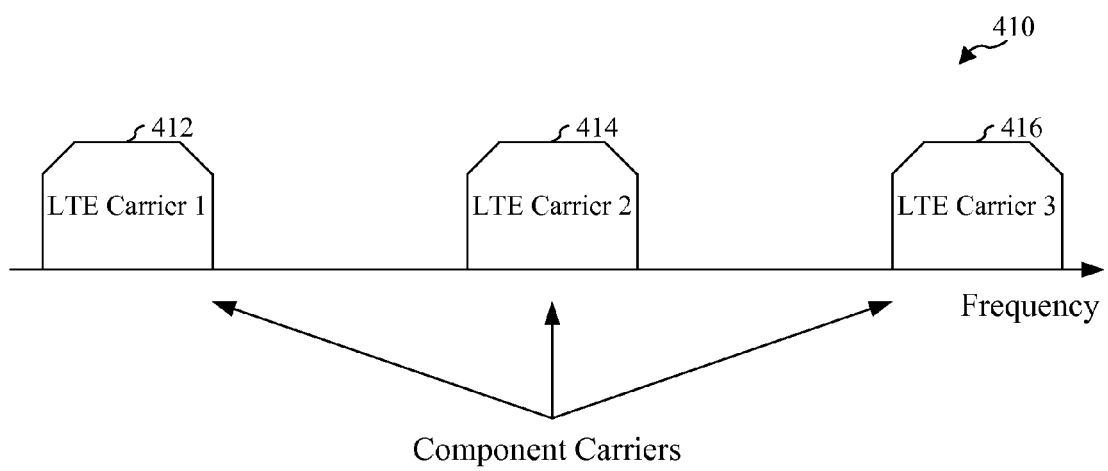
FIG. 4B discloses a non-continuous carrier aggregation type.

For the LTE-Advanced mobile systems, two types of carrier aggregation (CA) methods have been proposed, continuous CA and non-continuous CA, examples of which are illustrated in FIGS. 4A and 4B. Non-continuous CA occurs when multiple available component carriers 410 are separated along the frequency band (FIG. 4B). On the other hand, continuous CA occurs when multiple available component carriers 400 are adjacent to each other (FIG. 4A). As shown, for example, in continuous CA, carrier 1 402, carrier 2 404, and carrier 3 406 are adjacent in frequency. In non-continuous CA, carrier 1 412, carrier 2 414, and carrier 3 416 are not adjacent in frequency. Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNB) has fixed transmitting power on each component carrier, the effective coverage or supportable modulation and coding of each component carrier may be different.

Data Aggregation Schemes

Figure 5:
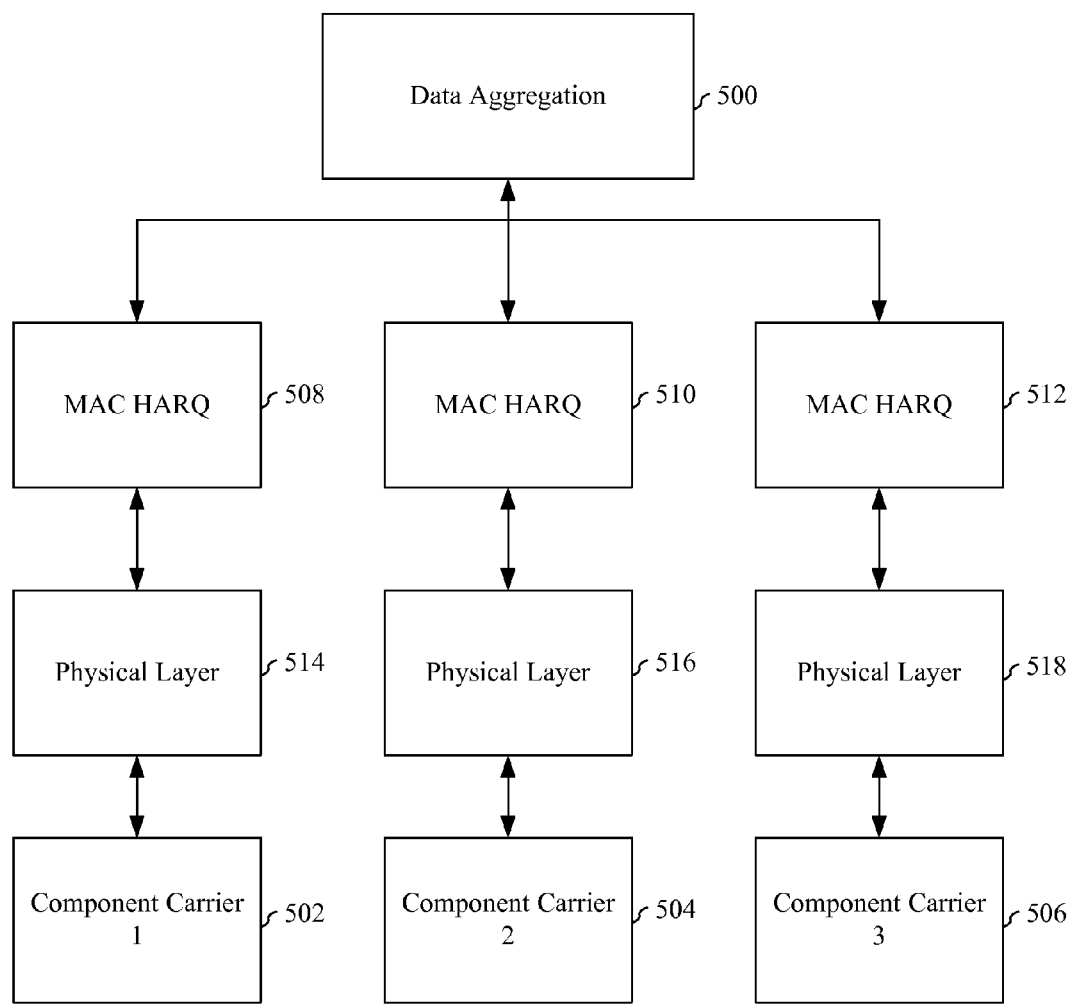
FIG. 5 discloses MAC layer data aggregation.

FIG. 5 illustrates performing data aggregation 500 to aggregate transmission blocks (TBs) from different component carriers 502, 504, and 506 at the medium access control (MAC) layer (FIG. 5) for an International Mobile Telecommunications (IMT)-Advanced or similar system. With MAC layer data aggregation, each component carrier has its own independent hybrid automatic repeat request (HARQ) entity 508, 510, and 512 in the MAC layer and its own transmission configuration parameters (e.g., transmitting power, modulation and coding schemes, and multiple antenna configuration) in the physical layer. Similarly, in the physical layer, one HARQ entity 514, 516, and 518 can be provided for each component carrier.

Control Signaling

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers can be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Handover Control

It is preferable to support transmission continuity during the handover procedure across multiple cells when CA is used for IMT-Advanced (International Mobile Telecommunications-Advanced) UE. However, reserving sufficient system resources (e.g., component carriers with good transmission quality) for the incoming UE with specific CA configurations and quality of service (QoS) requirements may be challenging for the next eNB. The reason is that the channel conditions of two (or more) adjacent cells (eNBs) may be different for the specific UE. In one approach, the UE measures the performance of only one component carrier in each adjacent cell. This offers similar measurement delay, complexity, and energy consumption as that in LTE systems. An estimate of the performance of the other component carriers in the corresponding cell may be based on the measurement result of the one component carrier. Based on this estimate, the handover decision and transmission configuration may be determined.

Figure 6:
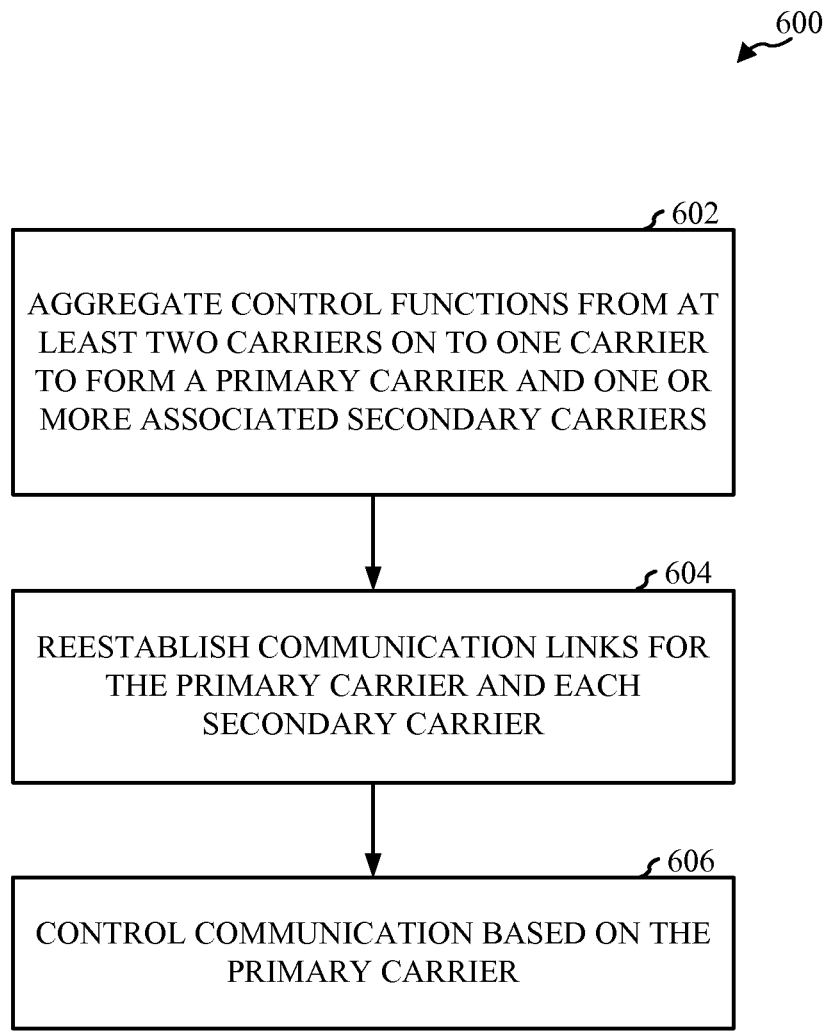
FIG. 6 is a block diagram illustrating a methodology for controlling radio links in multiple carrier configurations.

FIG. 6 illustrates a methodology 600 for controlling radio links in a multiple carrier wireless communication system by grouping physical channels, according to an aspect. As shown, the method includes, at block 602, aggregating control functions from at least two carriers onto one carrier to form a primary carrier and one or more associated secondary carriers. Next at block, 604, communication links are established for the primary carrier and each secondary carrier. Then, communication is controlled based on the primary carrier in block 606.

Transmitting with Varying T/P Ratios

The following concepts can be applied to CA and non-CA configurations alike. A base station can communicate within a subframe and/or RB using varying T/P power ratios, and the utilized T/P ratios can be communicated to one or more devices (e.g., by the base station) to allow the devices to determine the power of the related signals. For example, the determined powers can be used for the purpose of demodulating the signals, reporting CSI feedback of the signals, and/or the like. This can allow for more robust interference coordination schemes to be used among base stations such that a given base station can transmit over negotiated protected resources of another base station by using a lower power transmission. Moreover, the T/P ratio can be used to cancel colliding reference signal interference. In CA, the varying T/P ratio can allow a macro base station to transmit over substantially all carriers using full available power, at least for reference signal transmissions, to maximize a coverage area thereof, while specifying lower power data transmissions using the T/P ratio.

Figure 7:
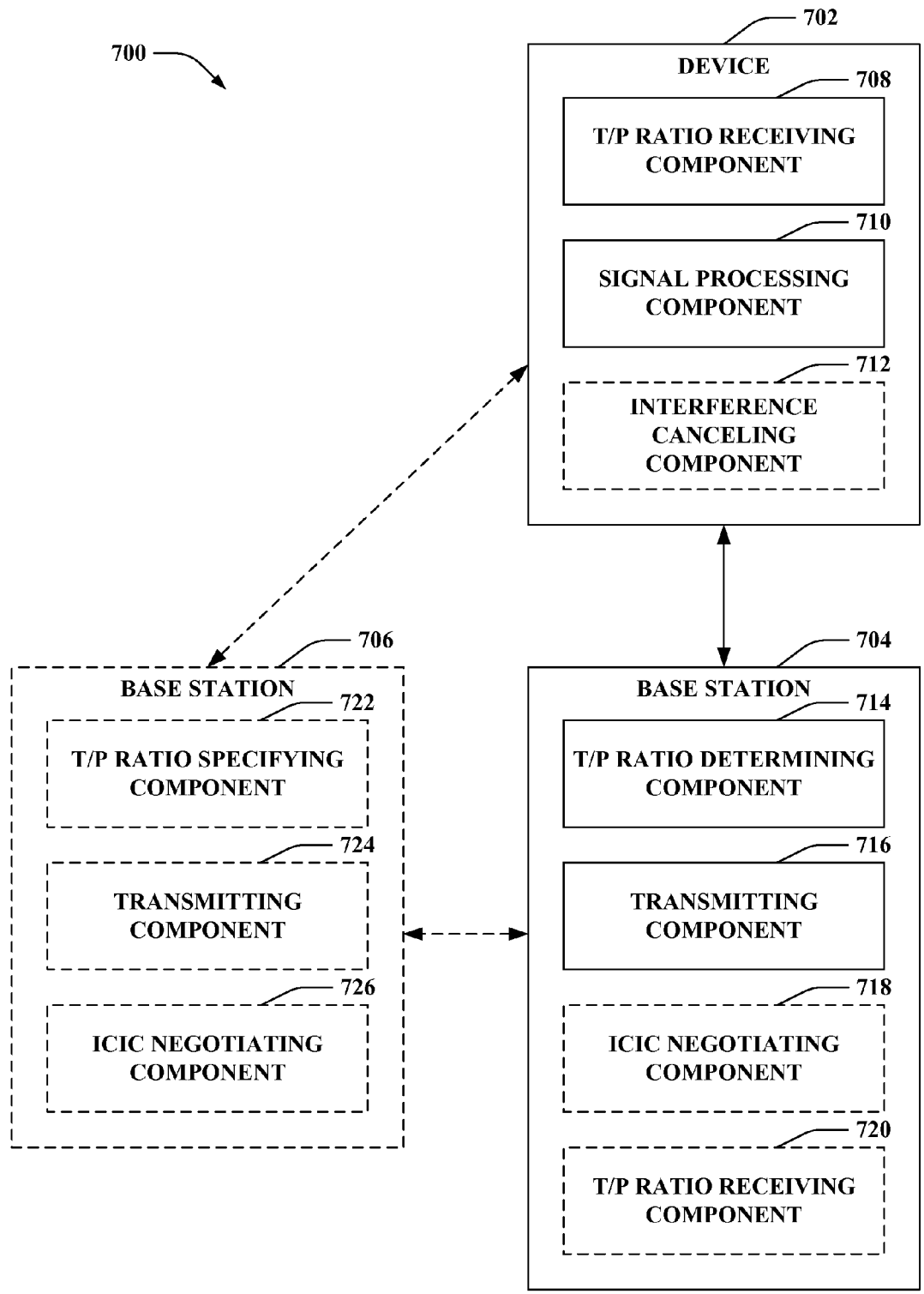
FIG. 7 is a block diagram of an example system for specifying traffic-to-pilot (T/P) ratios for communicating data signals at varying powers.

FIG. 7 illustrates an example system 700 for transmitting signals using different T/P ratios. System 700 includes a device 702 that communicates with a base station 704 to receive wireless network access. System 700 also includes a base station 706 that utilizes a similar frequency carrier as base station 704 for communicating with one or more devices, and can thus interfere with communications between device 702 and base station 704. Device 702 can be a UE, modem (or other tethered device), a portion thereof, and/or the like. Base stations 704 and 706 can each be a macro base station, a femto node, a pico node, a micro node, a mobile base station, a relay node, a device (e.g., communicating in peer-to-peer or ad-hoc mode with device 702), a portion thereof, and/or the like.

Device 702 can include a T/P ratio receiving component 708 for obtaining one or more T/P ratios used by a base station in transmitting data communications in one or more subframes or RBs, a signal processing component 710 for modifying signals from the base station based on the one or more T/P ratios, and an optional interference canceling component 712 for removing interference of an interfering base station from one or more signals based on the T/P ratio indicated for the interfering base station.

Base station 704 can include a T/P ratio determining component 714 for determining and/or specifying T/P ratios used by base station 704 in one or more subframes, RBs, etc. to one or more devices, and a transmitting component 716 for transmitting reference and/or data signals to the device 702. Base station 704 can optionally include an inter-cell interference coordination (ICIC) negotiating component 718 for negotiating protected resources with one or more surrounding base stations over which base station 704 is not to communicate with devices (or at least not communicate over a threshold power), and/or a T/P ratio receiving component 720 for obtaining a T/P ratio used by one or more surrounding base stations.

Base station 706 can optionally include a T/P ratio specifying component 722 for indicating one or more T/P ratios used in one or more subframes, RBs, etc. to one or more other base stations or devices, a transmitting component 724 for communicating data over the subframes or RBs (e.g., and/or reference signals) based on the T/P ratios, and/or an ICIC negotiating component 726 for negotiating protected resources with one or more base stations and/or determining a power over which the one or more base stations can communicate over the protected resources.

According to an example, T/P ratio determining component 714 can determine different T/P ratios for communicating data transmissions over different subframes and/or RBs. It is to be appreciated that T/P ratio determining component 714 can similarly determine different T/P ratios to utilize in transmitting over other divisions of time and/or frequency, such as one or more slots of the subframes, a communication frame, a collection of RBs, etc. In any case, T/P ratio determining component 714 can indicate the T/P ratios to device 702 (e.g., by advertising the T/P ratios in broadcast or dedicated signaling to one or more devices). For example, the T/P ratio determining component 714 can indicate the T/P ratios in a list of subframes or RBs, a map corresponding to available subframes or RBs, or other data structure, and can specify T/P ratios for subframes in a given communication frame, for one or more subsequent communication frames, and/or the like. In addition, the T/P ratio can be a value from 0 to 1 that relates to the proportion of power for transmitting data communications as compared to the power for transmitting reference signals.

In one example, T/P ratio receiving component 708 can obtain the T/P ratios for the various subframes and/or RBs. Thus, transmitting component 716 can transmit data signals over the subframes and/or RBs according to certain T/P ratio(s) per subframe and/or RBs. Signal processing component 710 can obtain signals from the base station 704 over the resources, and can determine a power for the data signals based on applying the corresponding T/P ratio to a power of a received reference signal. Signal processing component 710 can utilize the power to demodulate the data signals, report CSI feedback for the data signals, and/or the like. In this regard, base station 704 can communicate with device 702 over resources that may be utilized by base station 706 as well by communicating over a lower power as specified using the T/P ratio.

In one example, ICIC negotiating component 726 can negotiate resources with base station 704 over which base station 704 is to refrain from transmitting or at least limit transmit power. In this example, ICIC negotiating component 718 can determine such resources to be protected for certain devices communicating with base station 706, however transmitting over the resources using a transmit power below a threshold should not cause substantial interference over the resources. Thus, T/P ratio determining component 714 can determine to communicate with some devices, such as device 702, over such resources. In one example, this can be based on a location of device 702 relative to base station 704 and/or a CQI reported by the device (e.g., higher CQI can allow for lower transmission power over such resources). For example, such parameters can be evaluated to determine whether the device 702 is able to receive signals from base station 704 at the lower transmit power. In an example, for a given subframe, ICIC negotiating components 718 and 726 can negotiate protected resources in the time domain using eICIC. In another example, ICIC negotiating components 718 and 726 can negotiate protected resources in the frequency domain using ICIC.

Transmitting components 716 and 724 can each transmit a reference signal, such as a common reference signal (CRS), which can be used to demodulate data signals from the respective base stations 704 and 706. In one example, transmitting components 716 and 724 can transmit the CRSs over the same resources resulting in collision. In this example, in an aspect, interference canceling component 712 can partially cancel interference of the CRS transmitted by base station 706 based on T/P ratio information received regarding base station 706. For example, T/P ratio specifying component 722 can indicate T/P ratios used by base station 706 to similarly transmit data signals using varying powers. T/P ratio specifying component 722 can at least one of communicate the T/P ratios to base station 704 over a backhaul connection (which can be received by T/P ratio receiving component 720 and forwarded to device 702), signal the T/P ratios in a broadcast or dedicated signaling to one or more devices, as described, and/or the like. In any case, T/P ratio receiving component 708 can obtain T/P ratios used by base station 706, and can determine an amount of interference over one or more subframes or RBs attributable to CRS from base station 706 (e.g., one minus the indicated T/P ratio). Thus, interference canceling component 712 can cancel the determined interference caused by the CRS, and signal processing component 710 can demodulate and/or report CSI for the resulting signal.

In another example, base stations 704 and 706 can provide CA to facilitate communicating with device 702 over multiple carriers. Using the concepts described above, base station 704, which can be a macro base station in this example, can communicate CRSs over the multiple carriers using substantially full power to maximize the coverage area of base station 704 over the multiple carriers. T/P ratio determining component 714 can then vary power used to transmit data communications over other resources on at least a portion of the carriers using varying T/P ratios to specify the power.

Thus, base station 704 can still implement an ICIC scheme over the resources (e.g., with base station 706, as described), though the signal strength of the base station 704 over the CRS can be maximized over all carriers. In this example, as previously described, the T/P ratio receiving component 708 can obtain the T/P ratios, and signal processing component 710 can apply the T/P ratios over signals received in related subframes and/or RBs based on the CRS to demodulate the signals, report CSI for the signals, etc.

FIGS. 8-11 below illustrate example methodologies relating to utilizing varying T/P ratios for transmitting over subframes, resource blocks, or other time/frequency resource divisions. While, for purposes of simplicity of explanation, the methodologies are shown and described as a series of acts, it is to be understood and appreciated that the methodologies are not limited by the order of acts, as some acts may, in accordance with one or more embodiments, occur concurrently with other acts and/or in different orders from that shown and described herein. For example, it is to be appreciated that a methodology could alternatively be represented as a series of interrelated states or events, such as in a state diagram. Moreover, not all illustrated acts may be required to implement a methodology in accordance with one or more embodiments.

Figure 8:
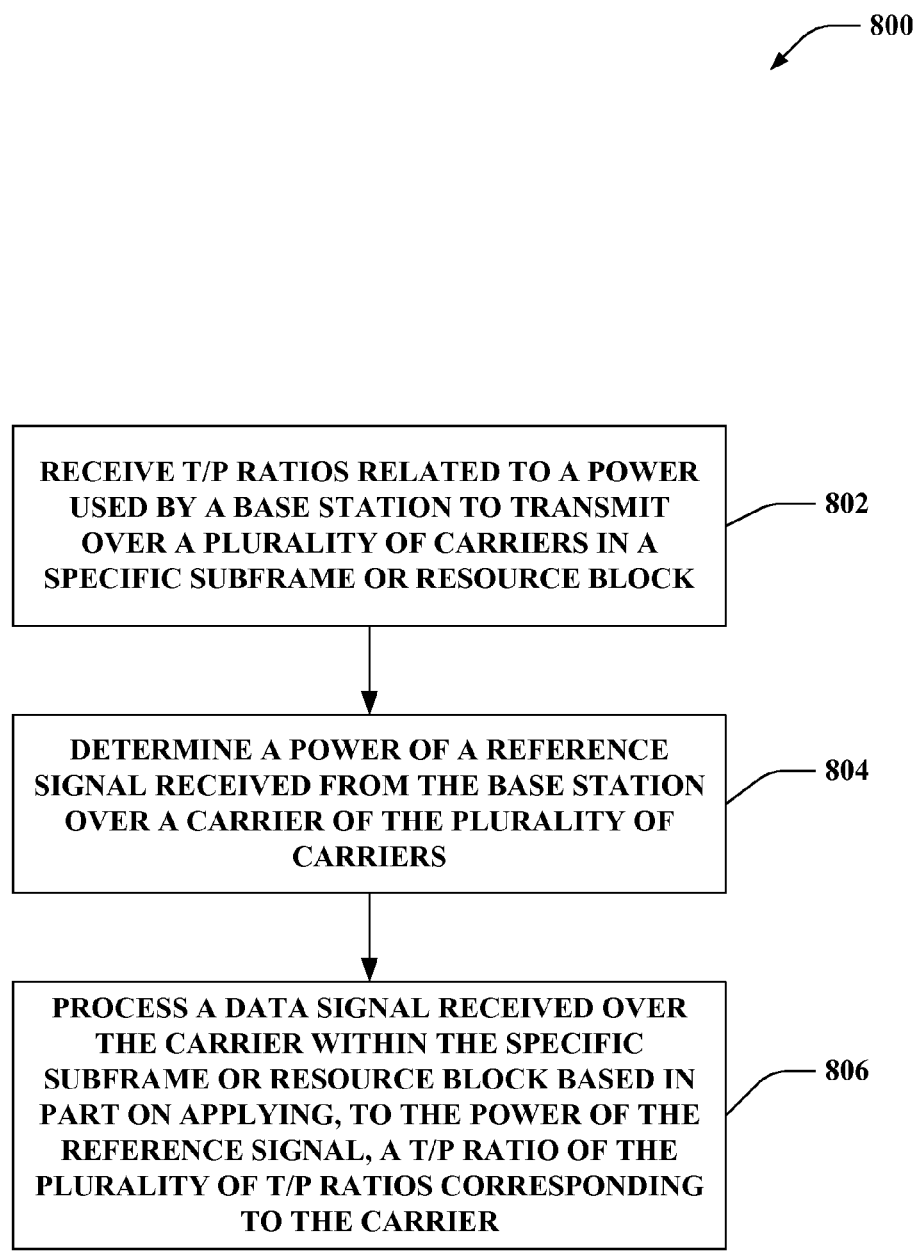
FIG. 8 is a flowchart of an example methodology for processing data signals based on indicated T/P ratios.

FIG. 8 illustrates an example methodology 800 for processing signals using received T/P ratios. At 802, a T/P ratio related to power used by a base station to transmit a data signal in a specific subframe or RB can be received. As described, this can include receiving a plurality of T/P ratios in a list, map, or other structure as specified for one or more communication frames, etc. The T/P ratios can be received from the base station and/or from another base station or network component, and can include a value from 0 to 1 or similar ratio indicator, as described. In an aspect, a plurality of T/P ratios each related to a power used by a base station to transmit over one of a plurality of carriers in a specific subframe or resource block can be received.

At 804, a power of a reference signal received from the base station can be determined. For example, the reference signal can be a CRS, and the power can be measured by a receiver. In an aspect, a power of a reference signal received from the base station over a carrier of the plurality of carriers can be determined.

At 806, a data signal received within the subframe or RB can be processed based in part on applying the T/P ratio to the power of the reference signal. For example, by applying the T/P ratio to the power of the reference signal, a power of the data signal can be acquired. In an aspect, a data signal received over the carrier within the specific subframe or resource block based in part on applying, to the power of the reference signal, a T/P ratio of the plurality of T/P ratios corresponding to the carrier can be processed. In another aspect, the power of the reference signal can be used to demodulate the data signal, to report CSI feedback related to the data signal, etc.

Figure 9:
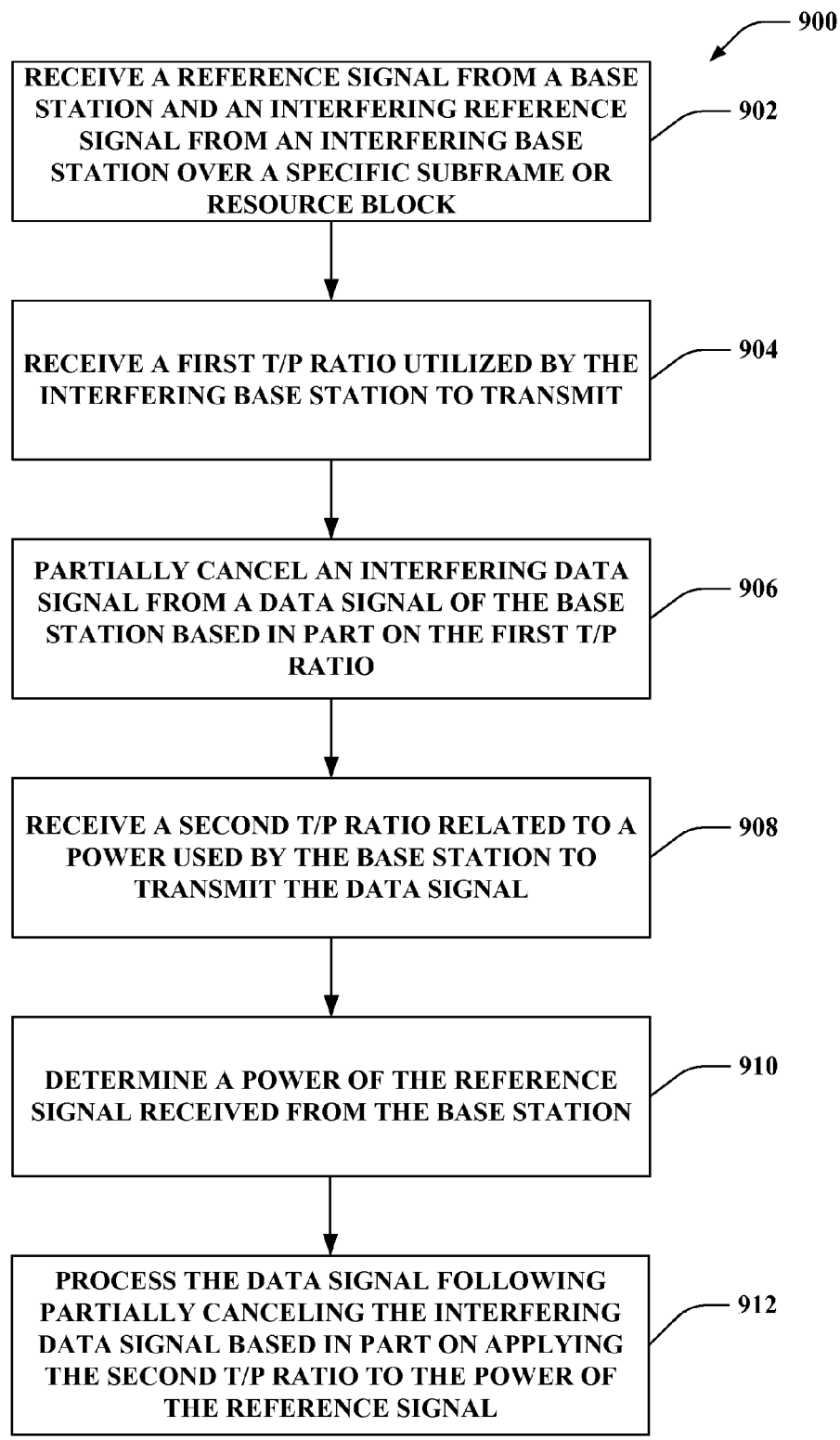
FIG. 9 is a flowchart of an example methodology for partially canceling interference of a reference signal from another base station.

FIG. 9 illustrates an example methodology 900 for partially canceling CRS of one or more interfering base stations. For example, one or more interfering base stations can similarly transmit using varying powers by specifying T/P ratios.

At 902, a reference signal from a base station can be received along with an interfering reference signal from an interfering base station over a specific subframe or resource block. As described, the serving base station and interfering base station can use similar resources for transmitting a reference signal (e.g., CRS), in some cases, and thus the reference signal from the serving base station is received with interference from the reference signal from the interfering base station.

At 904, a first T/P ratio utilized by the interfering base station to transmit over the specific subframe or resource block can be received. For example, the T/P ratio can be received in signaling from the interfering base station, from a serving base station, and/or the like. In one example, the T/P ratio can be for a subframe and/or RB over which reference signals of the interfering base station and the serving base station are known to collide.

At 906, a data signal can be partially canceled from the interfering base station based on the T/P ratio. For example, the T/P ratio can be used to determine a portion of interference attributable to the reference signal over the subframe or RB, and the reference signal of the interfering base station can be partially canceled according to the determined interference. The resulting signal, for example, can be processed by demodulation, reporting CSI feedback, and/or the like.

At 908 a second T/P ratio related to a power used by the base station to transmit the data signal in the specific subframe or resource block can be received.

At 910 a power of the reference signal received from the base station can be determined.

At 912, the data signal may be processed by applying the second T/P ratio to the determined power of the reference signal. In an aspect, as noted at block 906, an interfering data signal may also be partially canceled from the data signal as part of processing. In another aspect, the processing of the data signal may include using the power of the reference signal to demodulate the data signal, to report channel state information based on the data signal, and/or the like.

Figure 10:
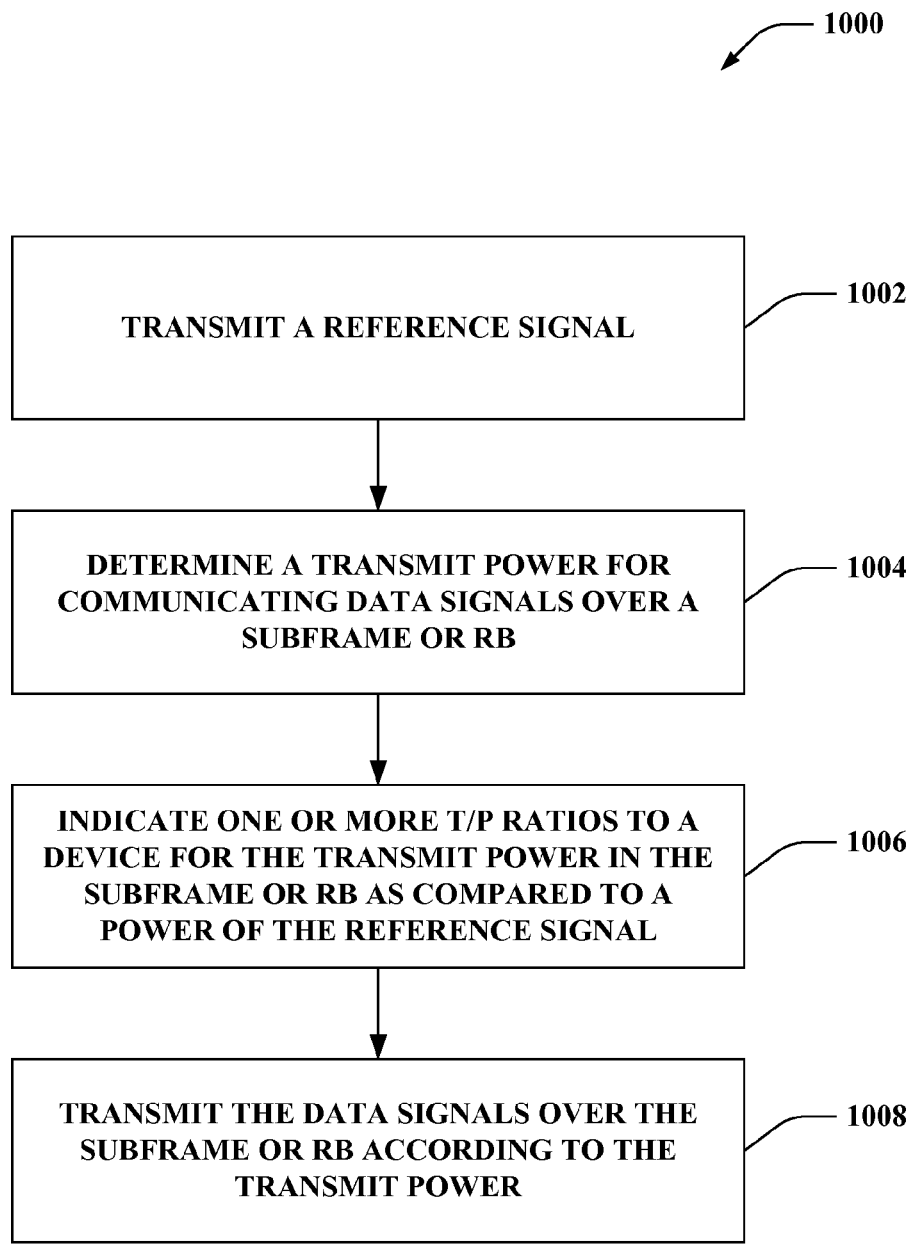
FIG. 10 is a flowchart of an example methodology for indicating T/P ratios for one or more data signal transmissions.

FIG. 10 illustrates an example methodology 1000 for transmitting signals at varying powers.

At 1002, a reference signal can be transmitted. For example, this can include transmitting a CRS or similar reference signal over control resources. In an aspect, reference signals may be transmitted over each of multiple carriers.

At 1004, a transmit power can be determined for communicating data signals over a subframe or RB. In one example, this can be based on negotiating resources with another base station using ICIC or a similar interference coordination scheme. In another example, an indication of the subframes or RBs can be received in a configuration, hardcoding, and/or the like. In an aspect, the determination may be performed for each of the multiple carriers.

At 1006, one or more T/P ratios can be indicated to a device for the transmit power in the subframe or RB as compared to a power of the reference signal. This can include signaling the T/P ratios to the device and/or to one or more base stations over a backhaul connection, etc. In an aspect, the T/P rations may be indicated for each of the multiple carriers. In addition, the T/P ratios can be signaled in a list, map, and/or the like, per communication from, for a given communication frame, etc., as described.

At 1008, the data signals can be transmitted over the subframe or RB according to the transmit power. In an aspect, the data signals may be transmitted over each of the multiple carriers. Thus, a power of a transmitter can be adjusted to result in transmitting the data signals at the transmit power.

Figure 11:
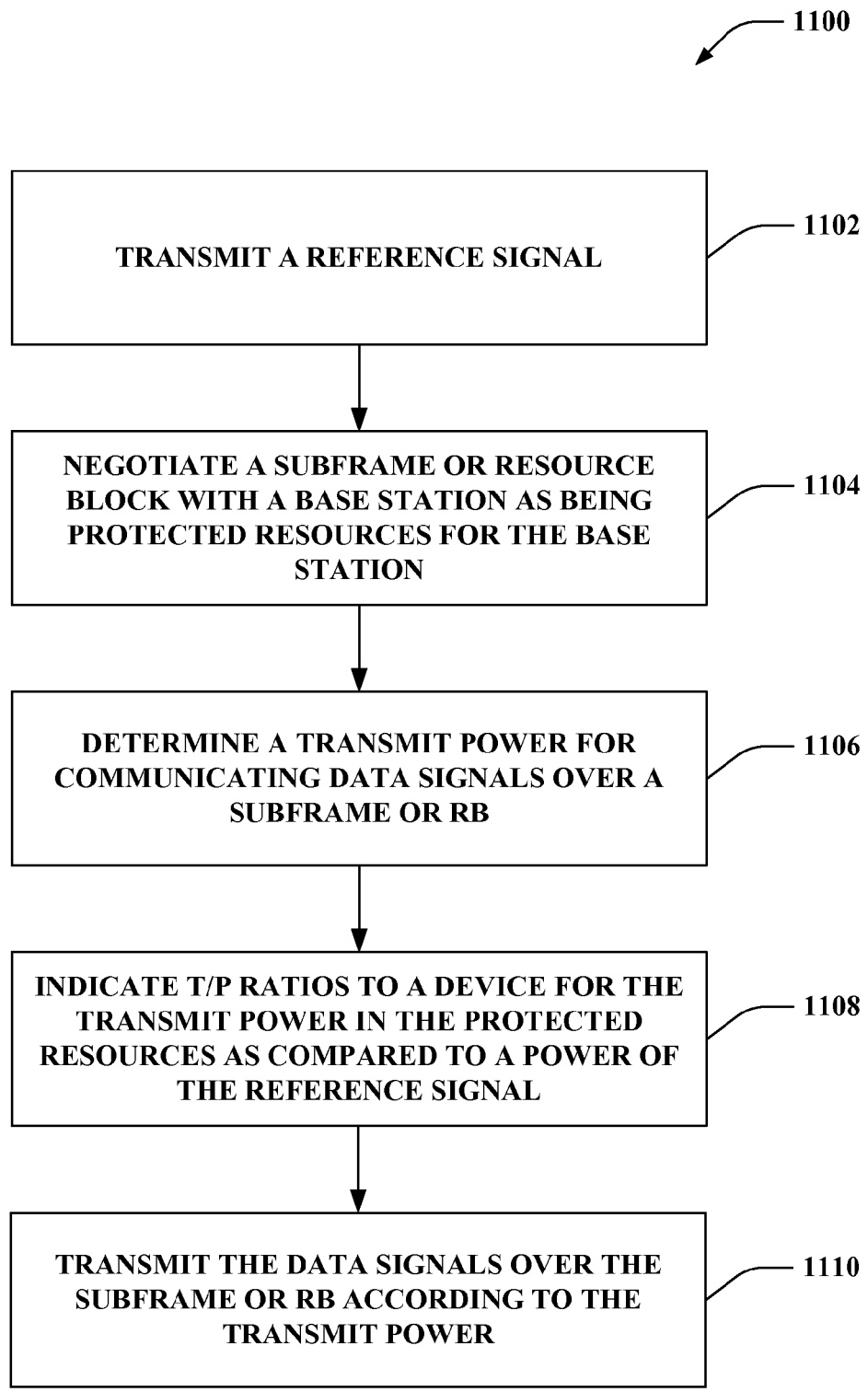
FIG. 11 is a flowchart of another example methodology for indicating T/P ratios for one or more data signal transmissions.

FIG. 11 illustrates an example methodology 1100 for transmitting signals at varying powers.

At 1102, a reference signal can be transmitted. For example, this can include transmitting a CRS or similar reference signal over control resources. In an aspect, reference signals may be transmitted over each of multiple carriers.

At 1104, a subframe or RB can be negotiated with a base station as being protected resources for the base station. In one example, this can be based on negotiating resources with another base station using ICIC or a similar interference coordination scheme. In an aspect, the transmit power may also be negotiated over the subframe or resource block.

At 1106, a transmit power can be determined for communicating data signals over the protected resources for the base station. In one example, an indication of the subframes or RBs can be received in a configuration, hardcoding, and/or the like. In an aspect, the determination may be performed for each of the multiple carriers.

At 1108, one or more T/P ratios can be indicated to a device for the transmit power in the subframe or RB as compared to a power of the reference signal. This can include signaling the T/P ratios to the device and/or to one or more base stations over a backhaul connection, etc. In an aspect, the T/P rations may be indicated for each of the multiple carriers. In addition, the T/P ratios can be signaled in a list, map, and/or the like, per communication from, for a given communication frame, etc., as described.

At 1110, the data signals can be transmitted over the subframe or RB according to the transmit power. In an aspect, the data signals may be transmitted over each of the multiple carriers. Thus, a power of a transmitter can be adjusted to result in transmitting the data signals at the transmit power.

It will be appreciated that, in accordance with one or more aspects described herein, inferences can be made regarding determining a transmit power for a subframe and/or RB, determining whether to partially cancel colliding CRSs, and/or the like, as described. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 12:
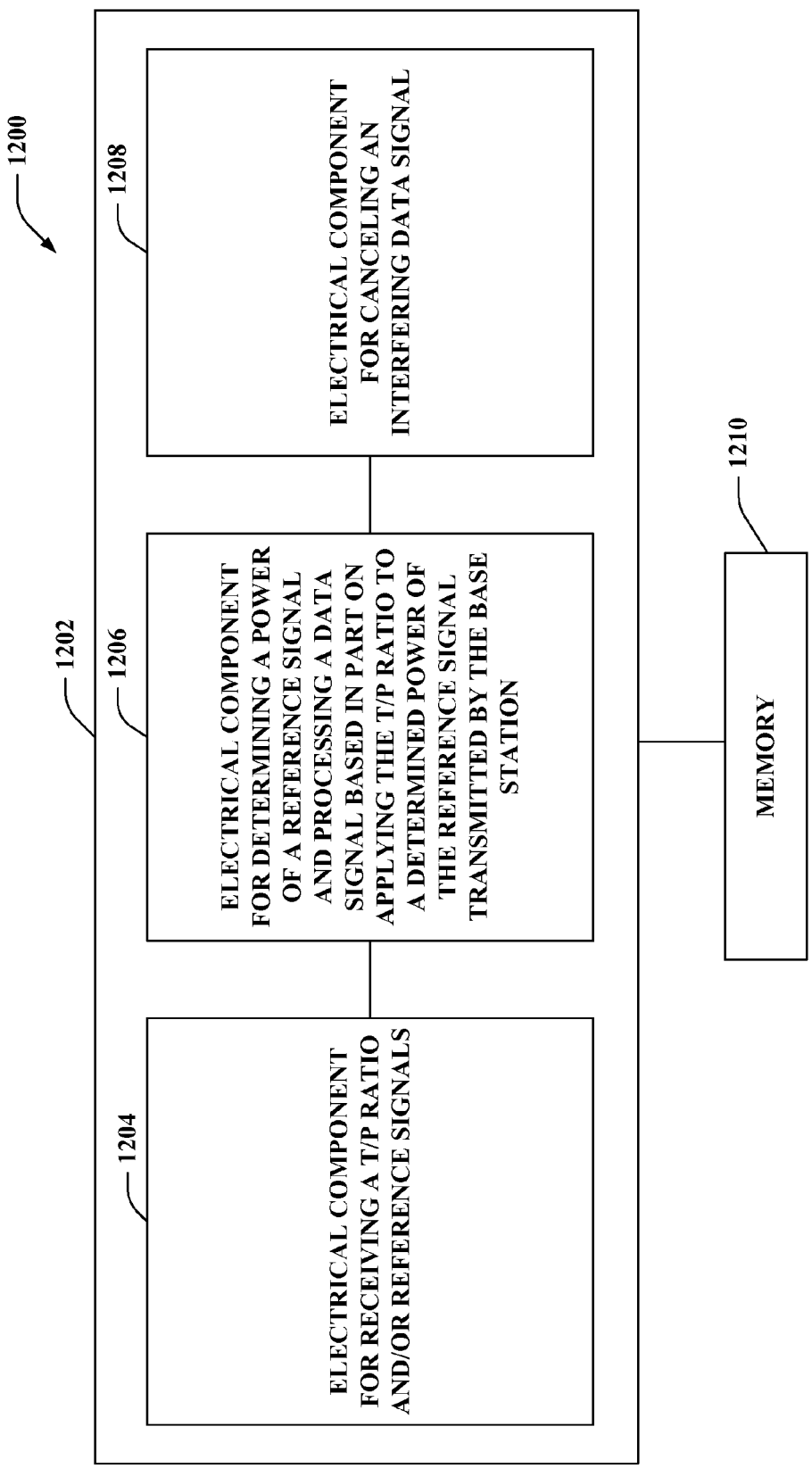
FIG. 12 is a block diagram of an example system that processes data signals based on indicated T/P ratios.

With reference to FIG. 12, illustrated is a system 1200 for processing signals based on one or more received T/P ratios. For example, system 1200 can reside at least partially within a device. It is to be appreciated that system 1200 is represented as including functional blocks, which can be functional blocks that represent functions implemented by a processor, software/firmware, or combinations thereof. System 1200 includes a logical grouping 1202 of components (e.g., electrical components) that can act in conjunction.

For instance, logical grouping 1202 can include an electrical component for receiving a T/P ratio related to a power used by a base station to transmit a data signal in a specific subframe or RB 1204. For example, the T/P ratio can be received in a list, map, or other structure with a plurality of ratios, as described. In an aspect, the electrical component for receiving 1204 may further be configured to receive a reference signal from a base station and an interfering reference signal from an interfering base station over a specific subframe or resource block. For example, electrical component 1204 can include a T/P ratio receiving component 708, as described above.

Further, logical grouping 1202 can comprise an electrical component for determining a power of a reference signal and processing a data signal received within the subframe or RB based in part on applying the T/P ratio to the determined power of a reference signal transmitted by the base station 1206. In an aspect, the electrical component for determining and/or processing 1206 may be configured to determine a power of a reference signal received from the base station over a carrier of the plurality of carriers, and process a data signal received over the carrier within the specific subframe or resource block based in part on applying, to the power of the reference signal, a T/P ratio of the plurality of T/P ratios corresponding to the carrier. As described, in an example, the power can be determined and used to demodulate the data signal, provide CSI feedback based on the data signal, etc. In addition, for example, electrical component 1206, in an aspect, can include a signal processing component 710, as described above.

Further, logical grouping 1202 can comprise an electrical component for partially canceling an interfering data signal of the interfering base station from a data signal of the base station received in the specific subframe or resource block based in part on the first T/P ratio 1208. In an aspect, the partially canceling of the interfering data signal, performed by electrical component 1208, may be performed as part of demodulating the data signal. In addition, for example, electrical component 1208, in an aspect, can include an interference canceling component 712, as described above.

Additionally, system 1200 can include a memory 1210 that retains instructions for executing functions associated with the electrical components 1204, 1206, and 1208. While shown as being external to memory 1210, it is to be understood that one or more of the electrical components 1204, 1206, and 1208 can exist within memory 1210. In one example, electrical components 1204, 1206, and 1208 can comprise at least one processor, or each electrical component 1204, 1206, and 1208 can be a corresponding module of at least one processor, such as controller/processor 380. Moreover, in an additional or alternative example, components 1204, 1206, and 1208 can be a computer program product comprising a computer readable medium, where each component 1204, 1206, and 1208 can be corresponding code.

Figure 13:
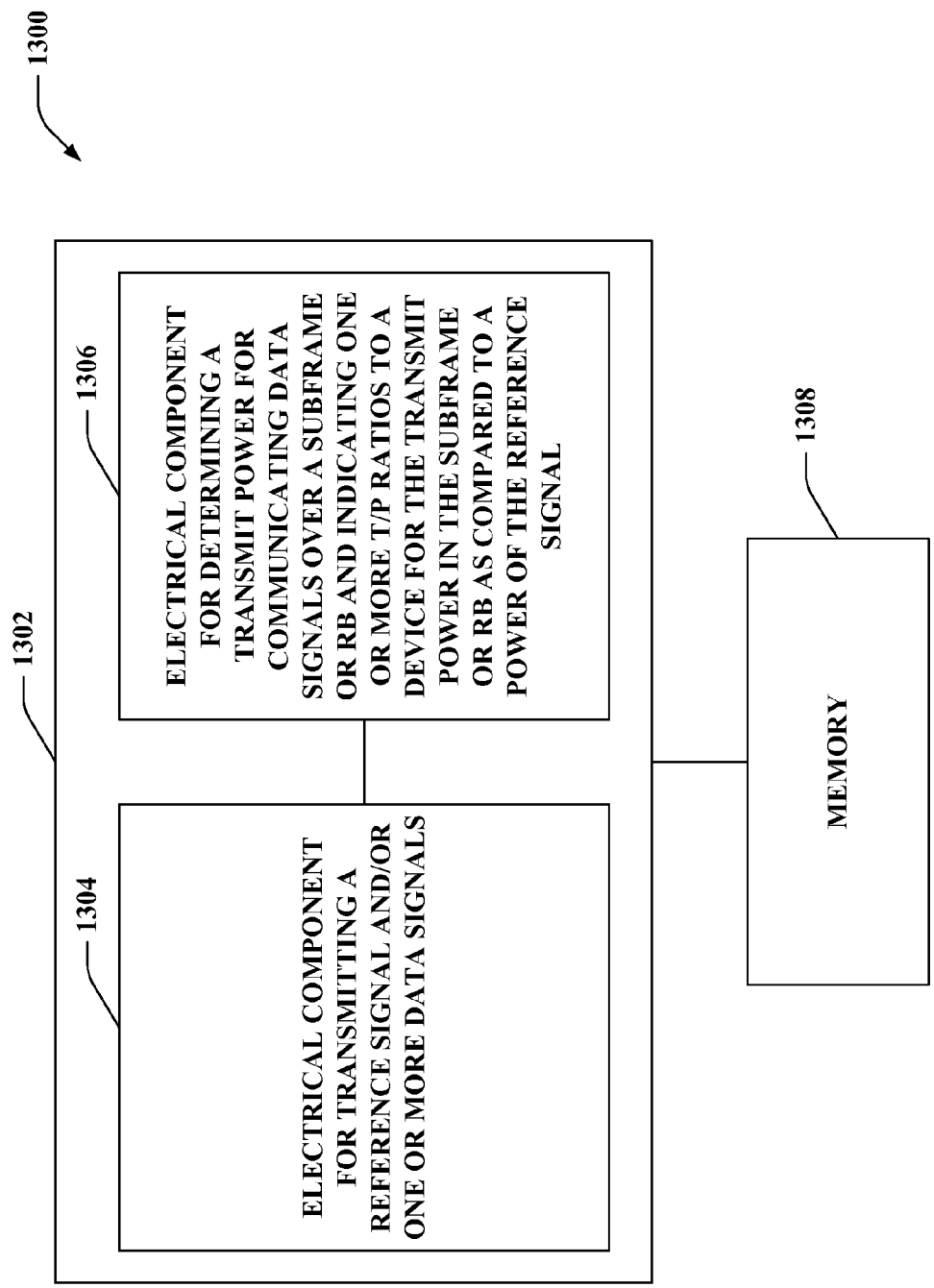
FIG. 13 is a block diagram an example system that indicates T/P ratios for one or more data signal transmissions.

With reference to FIG. 13, illustrated is a system 1300 for transmitting data signals using varying transmit power. For example, system 1300 can reside at least partially within a femto node, macro base station, or other base station. It is to be appreciated that system 1300 is represented as including functional blocks, which can be functional blocks that represent functions implemented by a processor, software/firmware, or combinations thereof. System 1300 includes a logical grouping 1302 of components (e.g., electrical components) that can act in conjunction.

For instance, logical grouping 1302 can include an electrical component for transmitting reference signals and/or one or more data signals 1304. In an aspect, electrical component 1304 may be configured to be used for each of multiple carriers. For example, electrical component 1304 can include a transmitting component 716, as described above.

Further, logical grouping 1302 can comprise an electrical component for determining a transmit power for communicating data signals over a subframe or RB and indicating one or more T/P ratios to a device for the transmit power in the subframe or RB as compared to a power of the reference signal 1306. In an aspect, electrical component 1306 may be configured to be used for each of multiple carriers. Thus, the electrical component 1304 can transmit the data signals at the transmit power for a given subframe or RB, and a receiver can demodulate or report feedback based on determining the power from the corresponding T/P ratio, as described. In an aspect, electrical component 1304 may be configured to negotiate a subframe or resource block with a base station as being protected resources for the base station. In addition, for example, electrical component 1306, in an aspect, can include a T/P ratio determining component 714, as described above. In another aspect, logical grouping 1302 may be configured to receive other T/P ratios from other base stations, and communicate the other T/P ratios to the device for partially canceling an interfering reference signal from the other base stations. In another aspect, logical grouping 1302 may be configured to receive channel state information feedback related to each of the multiple carriers from the device.

Additionally, system 1300 can include a memory 1308 that retains instructions for executing functions associated with the electrical components 1304 and 1306. While shown as being external to memory 1308, it is to be understood that one or more of the electrical components 1304 and 1306 can exist within memory 1308. In one example, electrical components 1304 and 1306 can comprise at least one processor, or each electrical component 1304 and 1306 can be a corresponding module of at least one processor, such as controller/processor 340. Moreover, in an additional or alternative example, components 1304 and 1306 can be a computer program product comprising a computer readable medium, where each component 1304 and 1306 can be corresponding code.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as hardware, software/firmware, or combinations thereof. To clearly illustrate this interchangeability of hardware and software/firmware, various illustrative components, blocks, modules, circuits, and steps have been described above generally in terms of their functionality. Whether such functionality is implemented as hardware or software/firmware depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or combinations thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software/firmware module executed by a processor, or in combinations thereof. A software/firmware module may reside in RAM memory, flash memory, ROM memory, EPROM memory, EEPROM memory, flash memory, phase change memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software/firmware, or combinations thereof. If implemented in software/firmware, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, flash memory, phase change memory, CD/DVD or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. A method for processing signals at a user equipment (UE) based on a traffic-to-pilot (T/P) ratio received from a base station, comprising:
 receiving, at the UE, a plurality of T/P ratios, wherein each T/P ratio is related to a power used by the base station to transmit over one of a plurality of carriers in a specific subframe or a specific resource block, and wherein a T/P ratio for a carrier of the plurality of carriers is a value between zero and one related to a proportion of a power for transmitting data signals and a power for transmitting reference signals;

determining a power of a reference signal received from the base station over a first carrier of the plurality of carriers, wherein the power of the reference signal is determined based on measurements by a receiver at the UE; and processing a data signal received over the first carrier within the specific subframe or the specific resource block at least by applying, to the determined power of the reference signal, a first T/P ratio of the plurality of T/P ratios corresponding to the first carrier, and wherein an interfering data signal from an interfering base station received in the specific subframe or the specific resource block is at least partially canceled at the UE during the processing of the data signal based on a corresponding T/P ratio transmitted by the interfering base station, wherein the power of the reference signal is used to demodulate the data signal or to report channel state information based on the data signal.

2. The method of claim 1, wherein the plurality of T/P ratios is received at the UE in a list or a map.

3. An apparatus for processing signals at a user equipment (UE) based on a traffic-to-pilot (T/P) ratio received from a base station, comprising:

means for receiving, at the UE, a plurality of T/P ratios, wherein each T/P ratio is related to a power used by the base station to transmit over one of a plurality of carriers in a specific subframe or a specific resource block, and wherein a T/P ratio of a carrier of the plurality of carriers is a value between zero and one related to a proportion of a power for transmitting data signals and a power for transmitting reference signals;

means for determining a power of a reference signal received from the base station over a first carrier of the plurality of carriers, wherein the power of the reference signal is determined based on measurements by a receiver at the UE; and means for processing a data signal received over the first carrier within the specific subframe or the specific resource block at least by applying, to the determined power of the reference signal, a first T/P ratio of the plurality of T/P ratios corresponding to the first carrier, and wherein an interfering data signal from an interfering base station received in the specific subframe or the specific resource block is at least partially canceled at the UE during the processing of the data signal based on a corresponding T/P ratio transmitted by the interfering base station, wherein the determined power of the reference signal is used to demodulate the data signal or to report channel state information based on the data signal.

4. The apparatus of claim 3, wherein the plurality of T/P ratios is received at the UE in a list or a map.

5. An apparatus for processing signals based on a traffic-to-pilot (T/P) ratio received from a base station, comprising:

a processor coupled to a memory, wherein the memory comprises executable instructions to cause the processor to:

receive a plurality of T/P ratios, wherein each T/P ratio is related to a power used by the base station to transmit over one of a plurality of carriers in a specific subframe or a specific resource block, wherein a T/P ratio of a carrier of the plurality of carriers is a value between zero and one related to a proportion of a power for transmitting data signals and a power for transmitting reference signals;

determine a power of a reference signal received from the base station over a first carrier of the plurality of carriers, wherein the power of the reference signal is determined based on measurements by a receiver at the apparatus; and process a data signal received over the first carrier within the specific subframe or the specific resource block at least by applying, to the determined power of the reference signal, a first T/P ratio of the plurality of T/P ratios corresponding to the first carrier, and wherein an interfering data signal from an interfering base station received in the specific subframe or the specific resource block is at least partially canceled at the UE during the processing of the data signal based on a corresponding T/P ratio transmitted by the interfering base station, wherein the determined power of the reference signal is used to demodulate the data signal or to report channel state information based on the data signal.

6. The apparatus of claim 5, wherein the plurality of T/P ratios is received at the UE in a list or a map.

7. A non-transitory computer-readable medium storing computer-executable code for processing signals at a user equipment (UE) based on a traffic-to-pilot (T/P) ratio received from a base station, comprising:

code executable to cause the UE to receive a plurality of T/P ratios, wherein each T/P ratio is related to a power used by the base station to transmit over one of a plurality of carriers in a specific subframe or a specific resource block, wherein a T/P ratio of a carrier of the plurality of carriers is a value between zero and one related to a proportion of a power for transmitting data signals and a power for transmitting reference signals;

code executable to cause the UE to determine a power of a reference signal received from the base station over a first carrier of the plurality of carriers, wherein the power of the reference signal is determined based on measurements by a receiver at the UE; and code executable to cause the UE to process a data signal received over the first carrier within the specific subframe or the specific resource block at least by applying, to the determined power of the reference signal, a first T/P ratio of the plurality of T/P ratios corresponding to the first carrier, and wherein an interfering data signal from an interfering base station received in the specific subframe or the specific resource block is at least partially canceled at the UE during the processing of the data signal based on a corresponding T/P ratio transmitted by the interfering base station, wherein the determined power of the reference signal is used to demodulate the data signal or to report channel state information based on the data signal.

8. The computer-readable medium of claim 7, wherein the plurality of T/P ratios is received at the UE in a list or a map.

* * * * *